US006772525B2

(12) United States Patent
Newcomer

(10) Patent No.: US 6,772,525 B2
(45) Date of Patent: Aug. 10, 2004

(54) LASER DEVICE FOR GUIDING A VEHICLE

(76) Inventor: Ronald E. Newcomer, 6417 Fairway Dr. West, Fayetteville, PA (US) 17222

( * ) Notice: Subject to any disclaimer, the term of this patent is extended or adjusted under 35 U.S.C. 154(b) by 0 days.

(21) Appl. No.: 10/320,476

(22) Filed: Dec. 17, 2002

(65) Prior Publication Data

US 2004/0111901 A1 Jun. 17, 2004

(51) Int. Cl.⁷ .................. G01C 15/00; G08G 1/0968
(52) U.S. Cl. ............................... 33/286; 33/264
(58) Field of Search ....................... 33/286, 264, 276

(56) References Cited

U.S. PATENT DOCUMENTS

| | | | |
|---|---|---|---|
| 4,084,339 A | | 4/1978 | Peltier et al. |
| 4,179,216 A | | 12/1979 | Theurer et al. |
| 4,180,322 A | | 12/1979 | Farcinade |
| 4,572,613 A | | 2/1986 | Mori |
| 4,665,378 A | | 5/1987 | Heckethorn |
| 4,677,753 A | * | 7/1987 | Loggers ..................... 33/264 |
| 4,700,301 A | | 10/1987 | Dyke |
| 4,773,018 A | | 9/1988 | Lundstrom |
| 4,933,864 A | | 6/1990 | Evans, Jr. et al. |
| 5,285,205 A | | 2/1994 | White |
| 5,295,073 A | | 3/1994 | Celette |
| 5,390,118 A | | 2/1995 | Margolis et al. |
| 5,575,550 A | | 11/1996 | Appeldorn et al. |
| 5,623,259 A | | 4/1997 | Giangardella |
| 5,646,614 A | | 7/1997 | Abersfelder et al. |
| 5,781,119 A | | 7/1998 | Yamashita et al. |
| 6,002,346 A | | 12/1999 | Bowden et al. |
| 6,040,787 A | | 3/2000 | Durham |
| 6,138,062 A | | 10/2000 | Usami |
| 6,140,941 A | | 10/2000 | Dwyer et al. |
| 6,150,943 A | | 11/2000 | Lehman et al. |
| 6,154,150 A | | 11/2000 | Laubach |
| 6,163,745 A | | 12/2000 | Purchase et al. |
| 6,184,800 B1 | | 2/2001 | Lewis |
| 6,191,706 B1 | | 2/2001 | Kositkun |
| 6,198,386 B1 | * | 3/2001 | White, II ..................... 33/264 |
| 6,218,962 B1 | | 4/2001 | Fiene |
| 6,222,459 B1 | | 4/2001 | Ting |
| 6,502,319 B1 | * | 1/2003 | Goodrich et al. ............. 33/286 |
| 6,598,304 B2 | * | 7/2003 | Akers .......................... 33/286 |

FOREIGN PATENT DOCUMENTS

| | | |
|---|---|---|
| JP | 62232008 | 10/1987 |
| JP | 2000265699 | 9/2000 |

OTHER PUBLICATIONS

Published US patent application No. US 2002/0011938, Krieger, Published –Jan. 31, 2002 (filed May 10, 2001).
Internet document found at http://www.ezpark.net (at least as early as May 23, 2002).
Zircon News Release, Zircon Introduces Self–Leveling Auto R Spinning Laser (prior to Dec. 17, 2002).

* cited by examiner

Primary Examiner—Christopher W. Fulton
(74) Attorney, Agent, or Firm—Stevens, Davis, Miller & Mosher, LLP

(57) ABSTRACT

A method and system for guiding a vehicle through a tunnel or other space. A linear beam of light is projected along a certain path through the space. As the vehicle travels into the space, the linear beam is shined upon the vehicle. Visually aligning an indicator on the vehicle with the linear beam of light indicates to the driver that the vehicle is traveling directly down the center of the path. The alignment occurs by the driver making manual adjustments of the vehicle's direction by turning wheels of the vehicle.

28 Claims, 7 Drawing Sheets

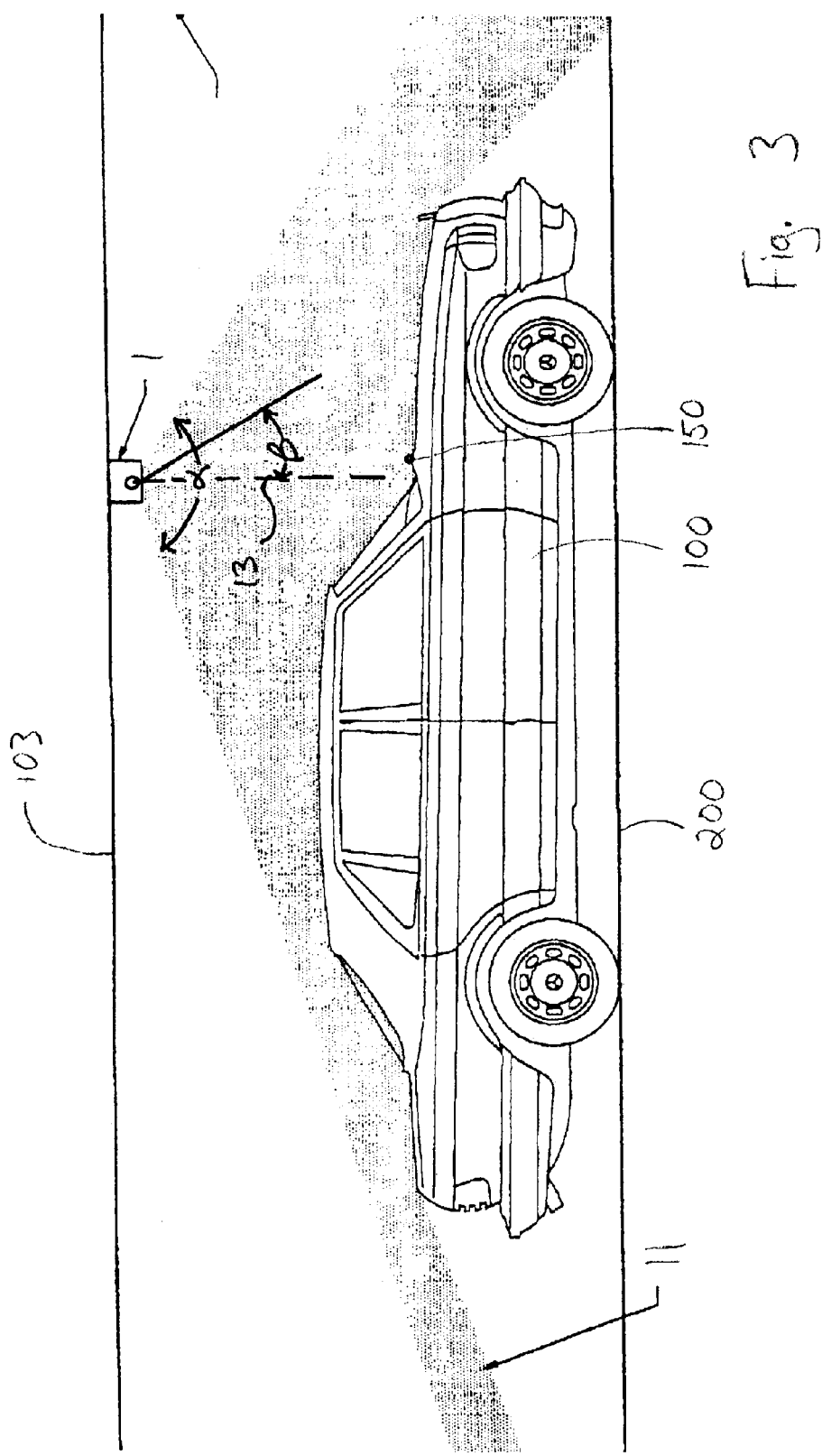

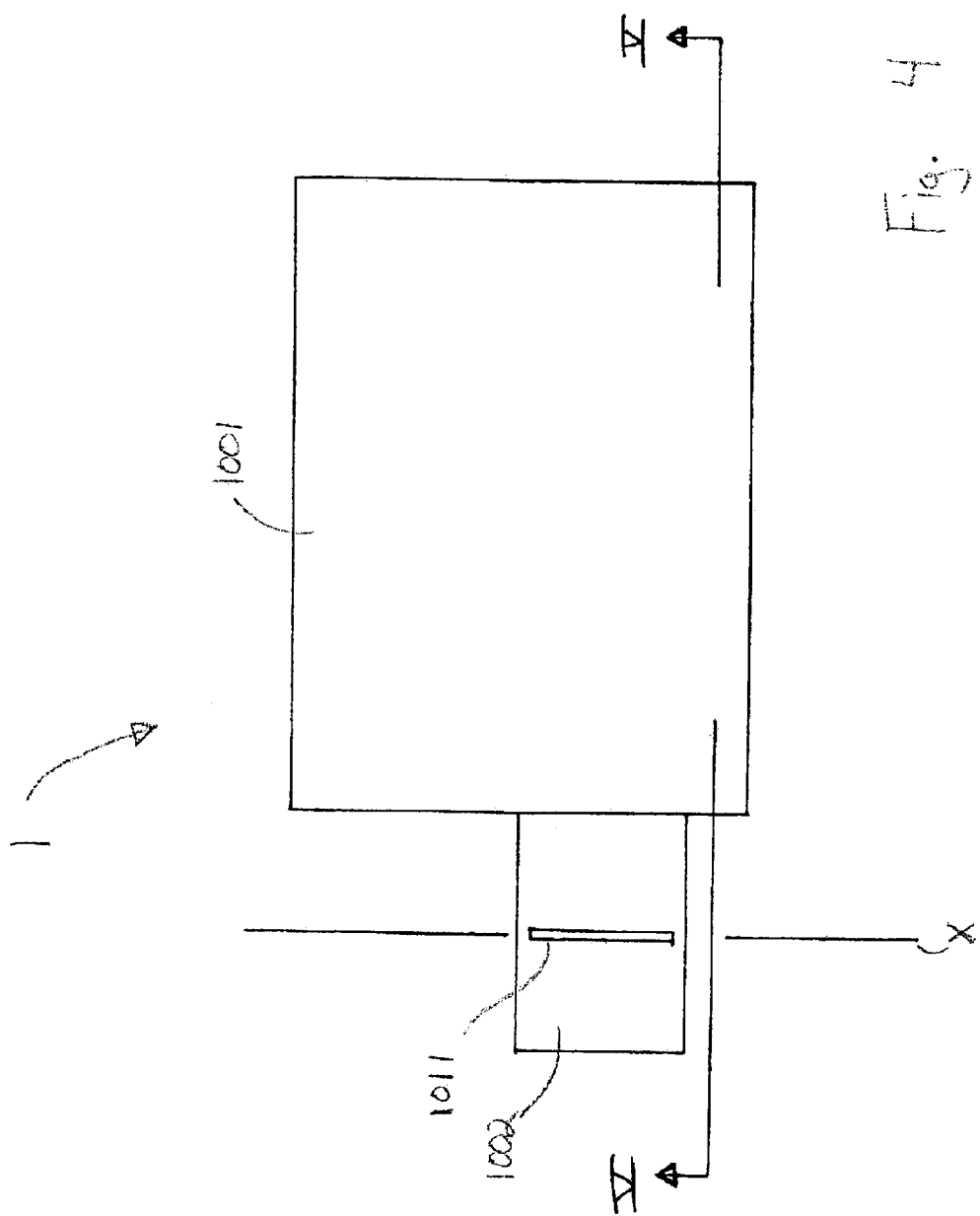

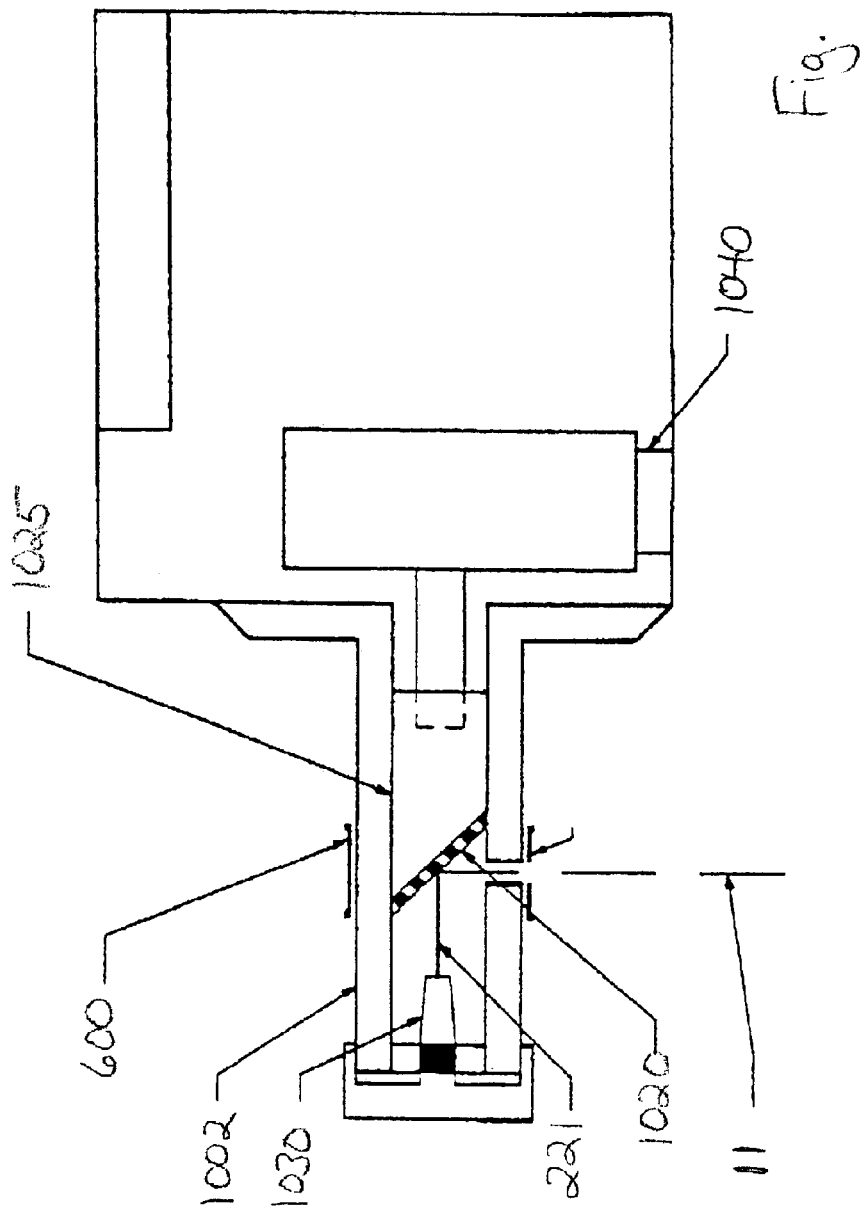

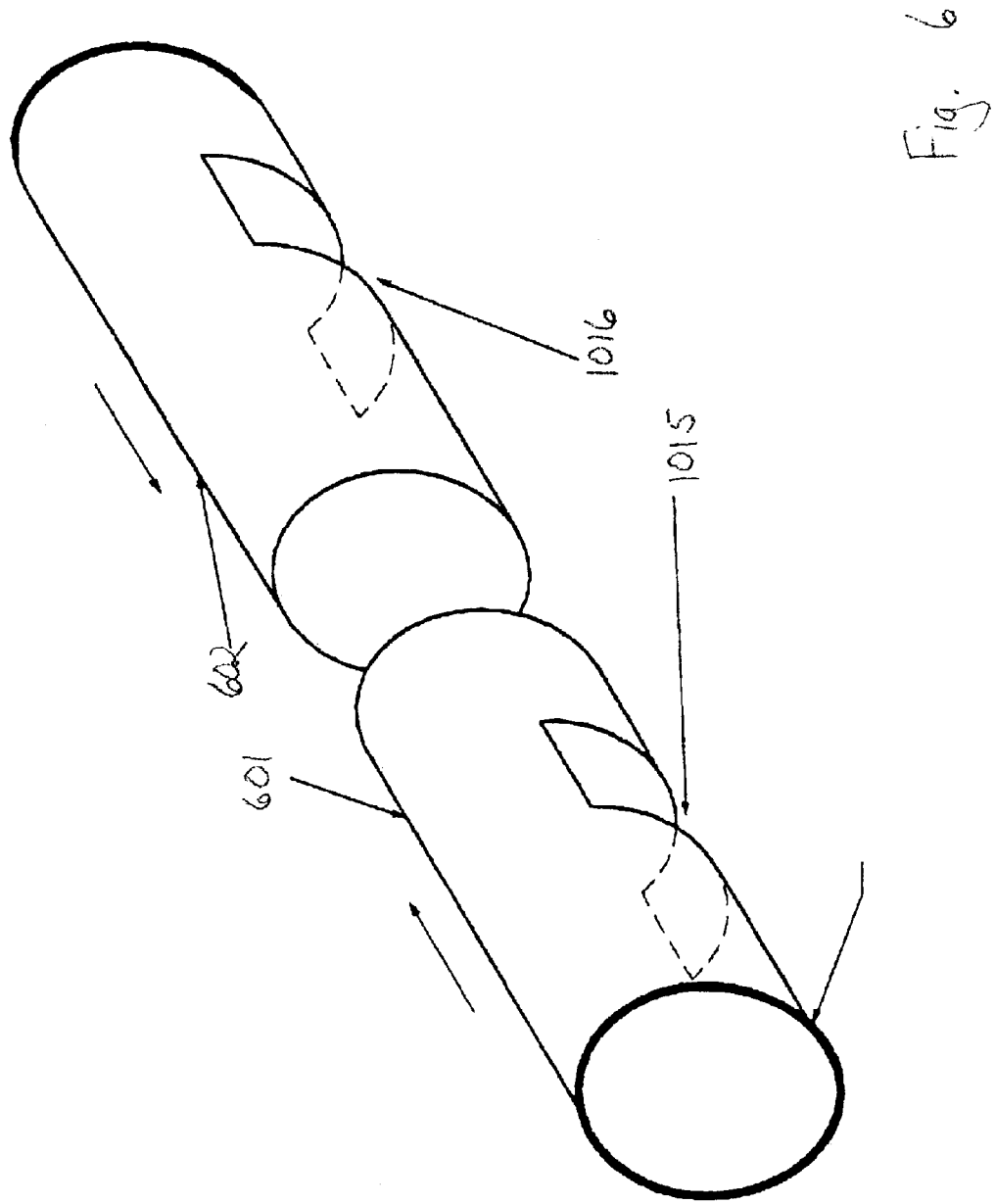

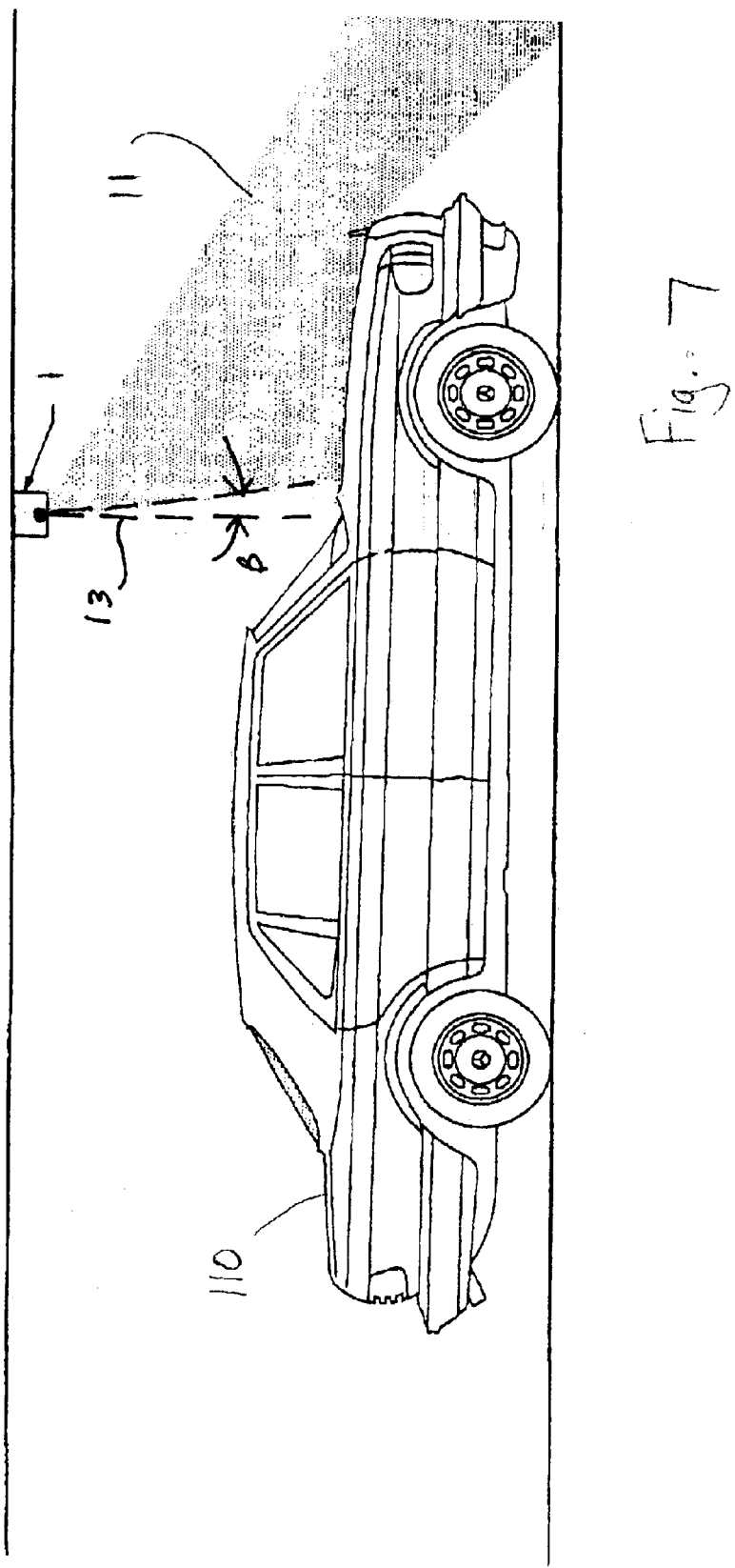

LASER DEVICE FOR GUIDING A VEHICLE

BACKGROUND OF INVENTION

This invention involves guidance systems to aid drivers in tunnels and the like to properly navigate a predetermined path along the length of the tunnel.

Many people are uncomfortable driving through long tunnels, especially those having either poor lighting or those having unclear lane designations. The driver may veer from his/her lane and travel either into the opposite lane or into a curb or other structure on the side of the road. A similar situation also occurs with respect to other structures similar to tunnels, such as beside toll booths and other small through-passages. The drivers may be unable to determine clearance around these structures and may contact the walls or barriers. This is especially true for wider vehicles or those pulling large items, such as boats or trailers. While the vehicle itself may easily clear the structure, a small misalignment may cause the trailer to contact the toll-both barriers.

The prior art discloses a wide variety of automated driving aids, namely U.S. Pat. No. 6,163,745 to Purchase et al, U.S. Pat. No. 5,781,119 to Yamashita et al and U.S. Pat. No. 4,933,864 to Evans, Jr. et al. Each of these references discloses a method whereby a beacon or the like is placed above the road, tunnel or hallway to guide a robot or automatic driving device for a vehicle through such road, tunnel or hallway. For example, Purchase et al disclose placing fluorescent material above a mining tunnel path which reflects a certain frequency of light As the automatically driven cart detects the specific frequency of light along the path, it is able to adjust its alignment to continue along the center of the path. However, each of the apparatuses used in these inventions requires extensive detection means and computer-aided machinery to guide the driving device through the tunnel, which can be very expensive. Additionally, once the vehicle exits the road, tunnel or hallway, the device becomes inoperative with the guide device. Further, none of these references operates in conjunction with a human driver to guide them along the road.

OBJECT AND SUMMARY OF INVENTION

It is therefore an object of this invention to overcome the disadvantages of the above noted devices and provide a guide system for guiding a human driver down a road or through a tunnel or the like. It is still a further object to provide a guide system that is simple in structure and requires minimal additions to existing vehicles. It is another object to provide a guide system that does not interfere with the normal driving operations of the vehicle whether inside the tunnel or the like or outside on the open road.

These and other objects of the invention are accomplished with a simple light guide system having a linear light source which provides a guiding line projected onto the road and the vehicle providing a reference for the vehicle to follow as it travels down the road, tunnel or the like. When the driver of the vehicle aligns the linear light source on a predetermined indicator on the vehicle, the vehicle is properly traveling down the center of the road lane, tunnel lane, or the like. This would be accomplished by turning the vehicle so that the vehicle moves laterally with respect to its line of travel so that the guiding line linear guiding ray coincides with the indicator. Such coincidence between the indicator and the guiding line assures that the driver is traveling down the center of the lane. The predetermined indicator is at a location on the vehicle predetermined by the driver, which can be a dot on the dashboard, windshield, or sticker placed on the vehicle, the center of the hood, the hood itself or any other item useable as a reference.

The light sources may be lasers or other devices that emit sufficiently bright light and fine light paths. A laser beam may be rotated in a circular pattern to change the single ray into a line ray or light from other light sources may be projected through slit arrays to create line rays.

For a longer tunnel, a group of light sources may be used spaced apart certain distances to provide a line ray along the entire length of the tunnel. Various guards and shields could be used to direct the light only in certain areas and block light from traveling into unwanted areas.

The line rays may also be projected from other structures where it is desired that the vehicle travel directly down the center of the pathway, such as the roof of a toll booth. As vehicles would pull into the lane beside the booth, the line ray would project onto the hood of the vehicle. Large vehicles or vehicles pulling a boat or trailer could align the line ray with an indicator of the vehicle to assure that they are traveling down the middle of the lane. This could prevent the large vehicle or its trailer from contacting a barrier or wall of the toll booth due to the vehicle being off-center in the lane.

BRIEF DESCRIPTION OF THE DRAWINGS

An embodiment of the invention will be described in conjunction with drawings of which:

FIG. 3 is a side view of the tunnel shown in FIG. 1, FIG. 4 is a bottom view the laser guide device, FIG. 5 is a cut away view of the laser guide device shown in FIG. 4 along line V—V, FIG. 6 is an illustration of the tubes for adjusting the throw of light, and FIG. 7 is a second illustration of FIG. 3 showing the throw of light adjusted.

DETAILED DESCRIPTION OF THE PREFERRED EMBODIMENT OF THE INVENTION

Figure 1:
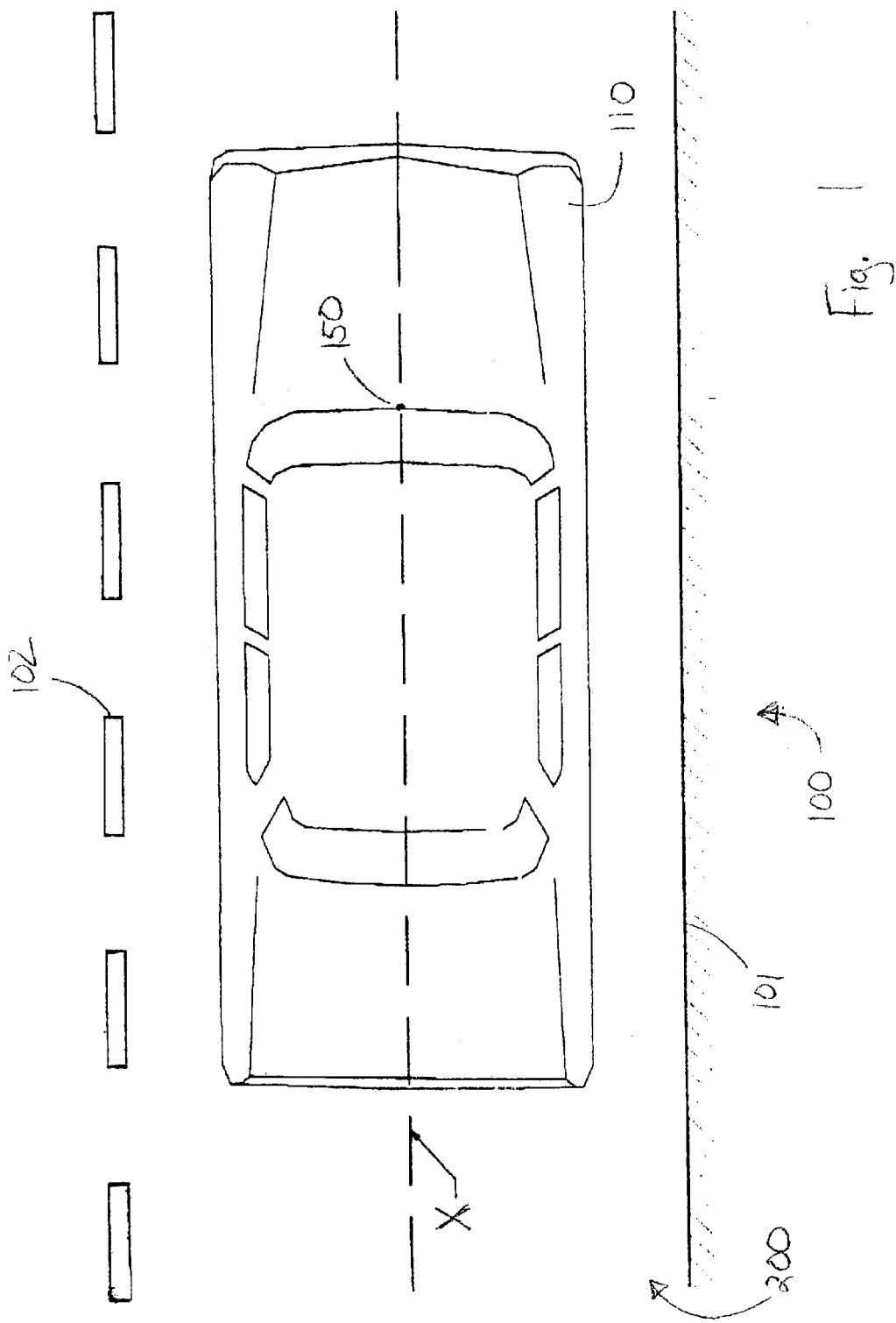
FIG. 1 is a perspective view of a roadway tunnel from above illustrating an embodiment of the invention.

Referring to FIG. 1, there is shown a perspective view of a tunnel 100 with a vehicle 110 traveling thereon along a right hand lane 200 of a roadway. The right hand lane 200 is defined by a tunnel wall 101 and a center strip 102. A vehicle traveling through the tunnel would preferably travel down the center of the lane to prevent the vehicle from interfering with oncoming traffic on the other side of the roadway (not shown) and contacting objects near tunnel wall 101, such as a sidewalk railing, etc. The right hand lane 200 has a center line X which extends along the center thereon. Vehicle 110 traveling down the lane, to avoid the mentioned pitfalls, would travel with the center of any vehicle coinciding with center line X.

In order to aid vehicle 110 to travel along center line X, the vehicle has a spot 150 which is be used as the predetermined indicator. The spot in this embodiment is located along the center of vehicle 110 and at the point where the windshield and hood of the vehicle meet. The coincidence between the spot and the center line X indicates to the driver that the vehicle is precisely traveling along center line X.

Figure 2:
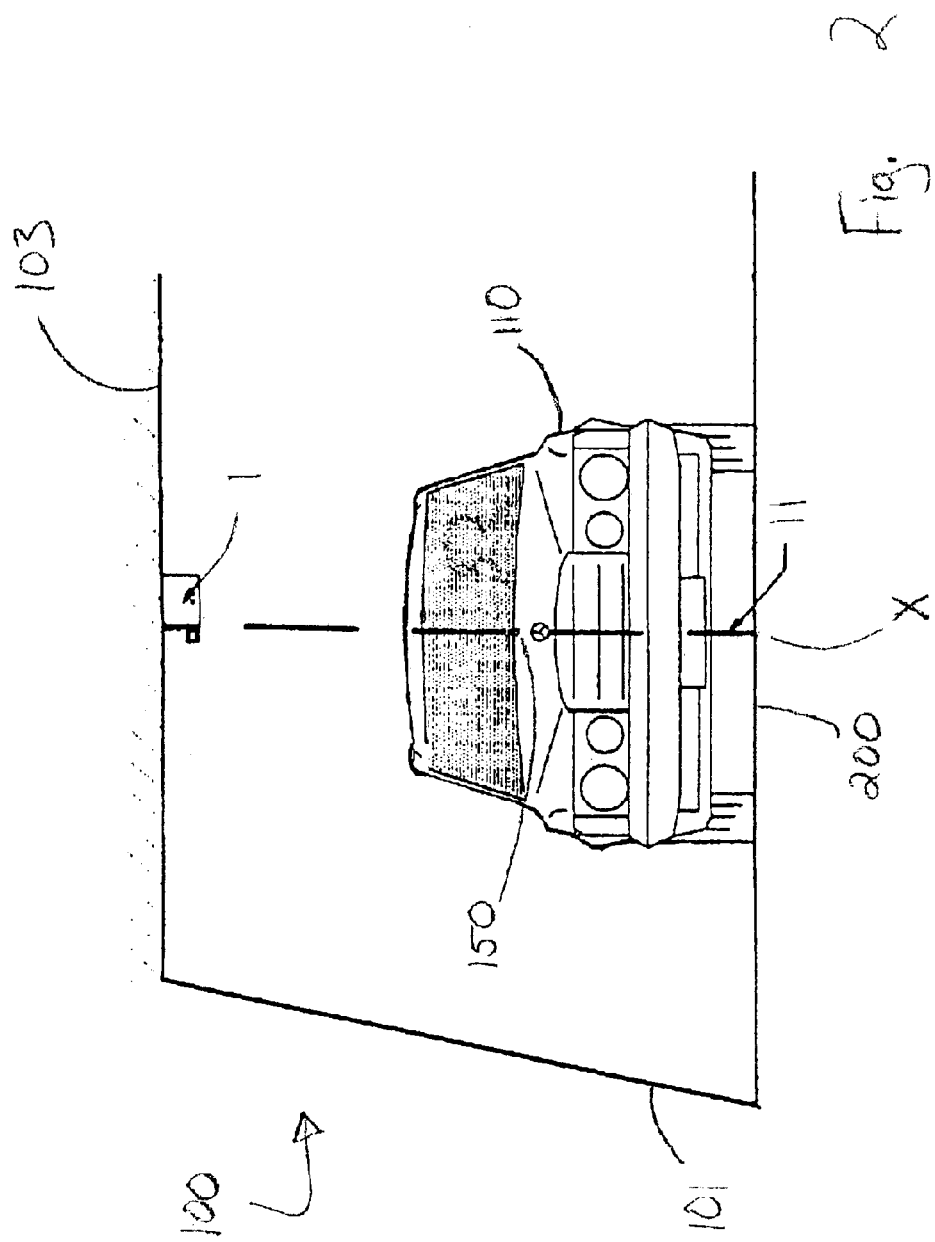
FIG. 2 is a front view of the tunnel shown in FIG. 1.

FIGS. 2 and 3 illustrate how the driver is guided by this embodiment of the invention. A guide device 1 is placed on the ceiling of the tunnel 100. It is attached by any means providing adequate holding of the guide device 1. The guide device 1 emits a linear guiding ray (line ray or light ray) of light 11 that extends within the tunnel 100. As is shown in FIG. 2, the guide device emits the linear beam of light 11 downward along the center of right hand lane. Note that linear ray 11 is emitted directly towards the center line X. As shown in FIG. 3, line ray 11 is emitted along the length of the tunnel. The gray area indicates the projection path of the ray. Such a guide device has the effect of producing a line ray that shines along the center line X and if an object is moved along center line X, the line ray 11 would be emitted directly onto the object.

As vehicle 110 enters the tunnel, line ray 11 will appear on the vehicle. Ideally the line ray 11 will appear on some region of the hood, at a position where the driver would be able to observe the line ray. As vehicle 110 travels, the driver will note the spot 150 in relation with line ray 11. The driver would then turn the vehicle 110 slightly to the right or the left to change the lateral position of the vehicle as it travels through the tunnel until the spot 150 and the line ray 11 coincide with each other. At this point of coincidence, the vehicle 110 is traveling down center line X of right hand lane 200.

For a longer tunnel and/or a curved tunnel, rather than using one guide device, several may be placed in a series arrangement to provide a line ray along the entire length of the center of the lane. Each successive guide device may be turned slightly to make up for the road bend or may project light at the maximum reach point of the previous guide device.

A general construction of a light device according to the invention will now be described with reference to FIGS. 4, 5 and 6. Guide device 1 generally comprises a box 1001 with a rotating laser 1002 extending therefrom wherein the line ray II is generated. Rotating laser 1002 has a light slit 1011 from which projects light ray 11 along the center line X.

A more detailed view of rotating laser 1002 is shown in FIG. 5. A laser 1030 is situated near an end of the rotating laser 1002. Laser 1030 projects a beam 221 into a spinning mirror 1020, which rotates in conjunction with a carriage bearing 1025. The carriage bearing 1025 is operatively connected to a motor 1040, which causes the spinning mirror 1020 to rotate rapidly. The mirror 1020 is spun sufficiently fast to change the appearance of beam 221 into a circular line ray moving away from guide device 1. The line ray is projected 360 degrees from the spinning mirror 1020. The spun beam 221 appears as a line onto whatever object it shines upon.

The rotating laser 1002 also has a guard tube 600 for blocking parts of the circular line rays. Guard tube 600 comprises a pair of tubes 601 and 602 (FIG. 6) that fit telescopically over each other. Each tube has a respective light slit 1015 and 1016 located centrally therein and extending around a circumference of the tube. Tube 601 slides over tube 601 and the slits 1015 and 1016 are aligned to form slit 1011 for allowing light to pass from inside the tubes. Guard tube 600 with the individual tubes 601 and 601 assembled together is then placed over the rotating laser 1002 as shown in FIG. 5. As the tubes 601 and 602 are rotated about their circumference with respect to each other, the circumferential width of slit 1011 is increased or decreased along with such rotation. Guard tube 600 is designed to cut off part of the circular line ray to form an arc line ray. This prevents the guide device from projecting the line rays to undesired locations, such as the ceiling, to a place where they could shine in the driver's eyes, or any other undesired location. Such is shown in FIG. 3 where the line ray 11 is cut down to a ray extending out at an angle α of about 135 degrees. Other arrangements of guard tube 600 are possible whereby line ray 11 is cut down anywhere from 360 degrees (full circular ray) to a 1 degree angle (small ray), e.g. about 90°, 60°, 45° or 30°. As a safety feature, the line ray 11 should be cut down so that the ray shines downstream with the direction of driver's movement through the tunnel without shining upstream, as shown in FIG. 7. For example, a typical downstream arc ranges from an angle B of 0° to about 5°, e.g., about 2°, downstream relative to an imaginary downward line 13 perpendicular to the guide device 1 to an angle of at most 45° or 60° downstream of the imaginary downward line perpendicular to the guide device 1. Such avoids the laser shining into the driver's eyes. The tubes 601 and 602 can also be telescoped with respect to each other in order to narrow the width of the slit 1011. This has the advantage of reducing the width of the line ray to create a more defined line ray for alignment with spot 150.

The guide device 1 may be operated as a stand-alone unit, operated via batteries or using a standard outlet in conjunction with a transformer. It may be turned on by a remote device or via a switch located within the tunnel and may always be on, even during bright daylight. Activation devices are well known to those having ordinary skill in the art and will not be discussed herein.

Although the present invention has been described and illustrated in detail, such explanation is to be clearly understood that the same is by way of illustration and example only, and is not to be taken by way of limitation. For example, the guide device need not specifically be use in conjunction with a tunnel, but can be used in any structure similar to a tunnel having a narrow driving space. Also, a car was used in the illustrations for the vehicle, but other vehicles, e.g. trucks, semis, may be used. Further, while rotating lasers were disclosed as the light projection source, other light sources may be used, such a normal light passed through slit arrays, spinning pen lights, etc.

It should be apparent that embodiments other than those described above come within the spirit and scope of the present invention. Thus, the spirit and scope of the present invention should be defined only by the terms of the claims.

I claim:

1. A method for guiding a vehicle along a roadway, comprising:

projecting a linear beam of light from at least one light source along a path on the roadway; and aligning an indicator on the vehicle with the linear beam of light to indicate the vehicle is traveling along the path.

2. The method according to claim 1, wherein projecting a linear beam of light includes mounting several light sources to generate the linear beam of light.

3. The method according to claim 2, wherein projecting the linear beam of light includes blocking a portion of the linear beam of light with guard devices.

4. The method according to claim 1, wherein projecting the linear beam of light includes blocking a portion of the linear beam of light with a guard device.

5. The method according to claim 1, wherein the path is a lane of traffic in a highway.

6. The method according to claim 5, wherein the lane of traffic is located in a tunnel.

7. The method according to claim 1, wherein a rotating laser projects the linear beam of light.

8. The method according to claim 7, wherein the rotating laser sweeps the beam across an arc starting from about 5° downstream of a downward line perpendicular to the respective rotating laser to at most about 60° downstream of the downward line perpendicular to the respective rotating laser.

9. The method according to claim 1, wherein the step of aligning includes changing directions of the vehicle.

10. The method according to claim 1, wherein the step of aligning includes a driver within the vehicle:
   viewing the location of the linear beam of light and the indicator, and
   manually turning the vehicle until the linear beam of light projects on the indicator.

11. The method according to claim 1, wherein the step of aligning includes a driver within the vehicle visually aligning the vehicle so the linear beam of light is projected onto the indicator.

12. The method according to claim 1, wherein the indicator is within the field of view of a driver for the vehicle.

13. The method according to claim 1, wherein the at least one light source is mounted on a ceiling above the path.

14. A system for guiding a vehicle traveling through a space, comprising:
   an indicator on the vehicle; and
   at least one light source mounted to a surface above the path to project a linear beam of light downwardly along the path through the space, the beam being projected both in front of and on the vehicle;
   wherein when the indicator is aligned with the beam of light, the vehicle is traveling along the path.

15. The system according to claim 14, wherein the at least one light source comprises several individual light sources.

16. The system according to claim 15, wherein each light source has a guard to block a portion of the linear beam of light.

17. The system according to claim 14, wherein the at least one light source has a guard to block a portion of the linear beam of light.

18. The system according to claim 14, wherein the system is located within a tunnel.

19. The system according to claim 18, wherein the at least one light source is mounted on a ceiling of the tunnel.

20. The system according to claim 14, wherein the path is a lane of traffic in a highway.

21. The system according to claim 14, wherein the system is located to project along a lane beside a toll booth.

22. The system according to claim 21, wherein the at least one light source is mounted on an overhead structure of the toll booth.

23. The system according to claim 14, wherein the at least one light source comprises a rotating laser.

24. The system according to claim 23, wherein each at least one light source is for sweeping the beam across an arc starting from about 5° downstream of an imaginary downward line perpendicular to the respective light source to at most about 60° downstream of the imaginary downward line perpendicular to the respective light source.

25. The system according to claim 14, wherein the indicator is aligned with the linear beam of light when the linear beam of light projects onto the indicator.

26. The system according to claim 14, wherein the indicator and light source are located such that the indicator is visually alignable by a driver of the vehicle with the linear beam of light.

27. The system according to claim 14, wherein the indicator is within the field of view of a driver within the vehicle.

28. The system according to claim 14, wherein the at least one light source is mounted on a ceiling above the path.

* * * * *